United States Patent

Peisner et al.

[15] 3,673,969
[45] July 4, 1972

[54] VEHICLE TIE-DOWN DEVICE

[72] Inventors: Israel E. Peisner, Huntington Woods; George H. Stol, Berkley; Eugene D. Gotcher, Gibraltar, all of Mich.

[73] Assignee: Whitehead & Kales Company, River Rouge, Mich.

[22] Filed: May 7, 1970

[21] Appl. No.: 35,498

[52] U.S. Cl. .................................105/369 A, 105/368 T
[51] Int. Cl. .................................B60P 7/08, B61d 45/00
[58] Field of Search ............106/368 T, 369 A; 280/179.1; 248/361 A, 119 R

[56] References Cited

UNITED STATES PATENTS

| | | | |
|---|---|---|---|
| 3,158,108 | 11/1964 | Sharp | 105/369 A |
| 3,564,577 | 2/1971 | Blunden et al. | 105/369 A |
| 3,507,471 | 4/1970 | Haynes, Jr. et al. | 105/368 T |
| 3,038,740 | 6/1962 | Blunden | 105/368 T |
| 3,120,375 | 2/1964 | Haynes | 105/368 T |
| 3,181,886 | 4/1965 | Blunden et al. | 105/368 T |
| 3,348,273 | 10/1967 | Hall | 105/368 T |
| 3,381,925 | 5/1968 | Higuchi | 105/369 A |

*Primary Examiner*—Drayton E. Hoffman
*Attorney*—Whittemore, Hulbert & Belknap

[57] ABSTRACT

A vehicle tie-dow device comprising a carriage adapted to be locked in longitudinally adjusted position on a rail extending lengthwise of the deck of a transport, such as a rail car. The carriage has a rotatable shaft upon which is wound a chain adapted to engage ad hold a vehicle. The shaft has a lug normally preventing it from being withdraw from the carriage, but the shaft may be tilted to clear the lug ad permit the shaft to be withdrawn or inserted. A ratchet gear ad pawl are provided for preventing shaft rotation in one direction. The pawl has a tab overlying the gear to prevent accidental withdrawal of the shaft when the gear is engaged by the pawl. A sprig pressed lock pin on the carriage secures the carriage to the rail.

14 Claims, 8 Drawing Figures

PATENTED JUL 4 1972

INVENTORS
ISRAEL D. PEISNER
GEORGE H. STOL
EUGENE D. GOTCHER
BY
Whittemore, Hulbert & Belknap
ATTORNEYS

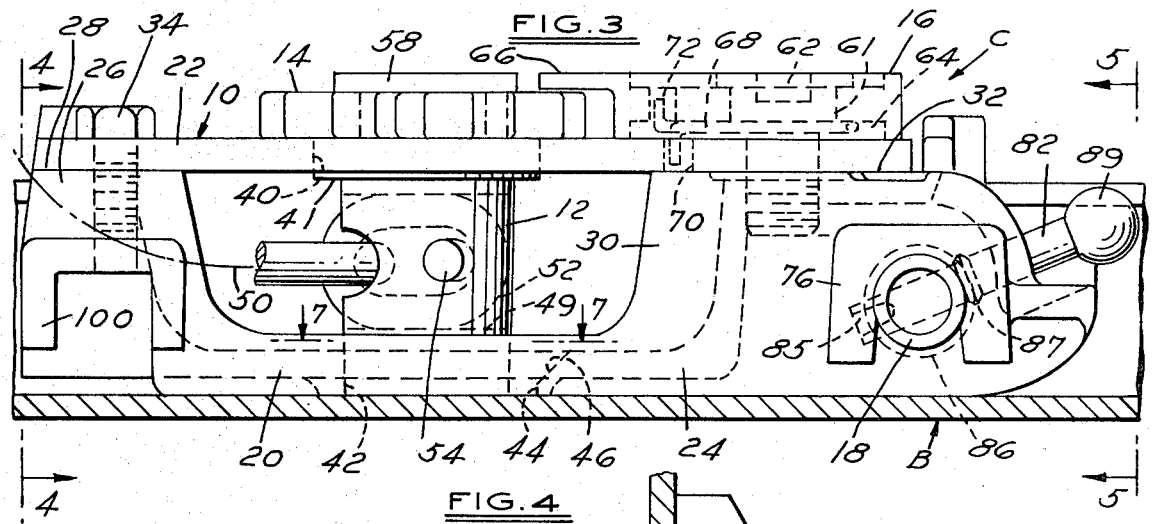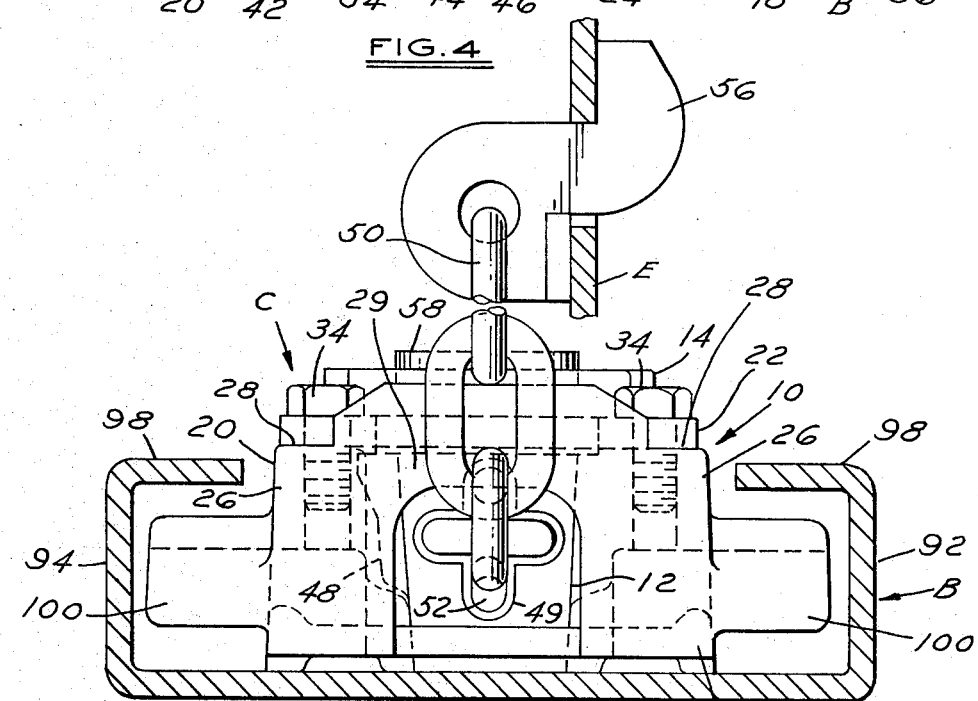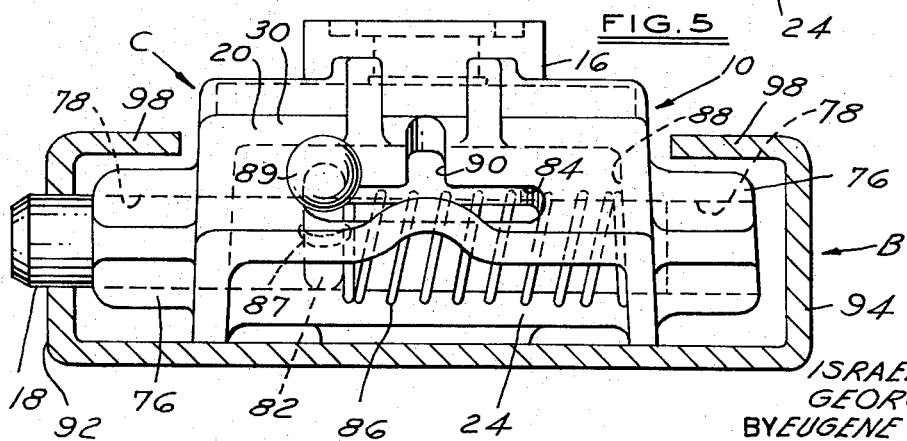

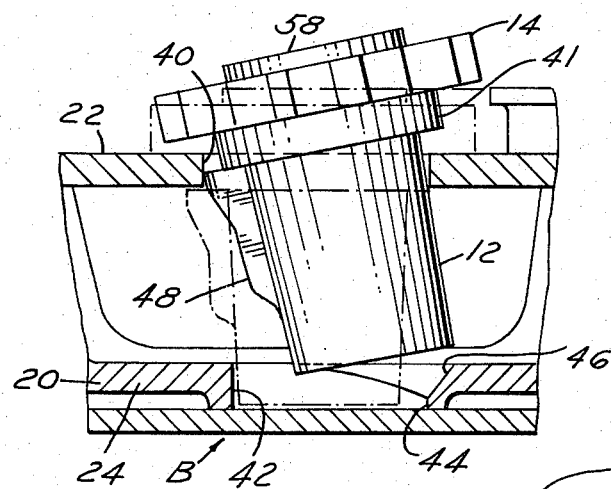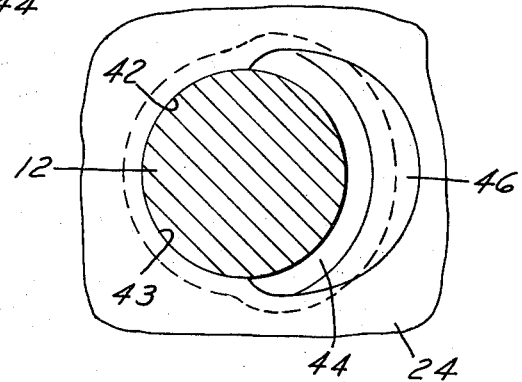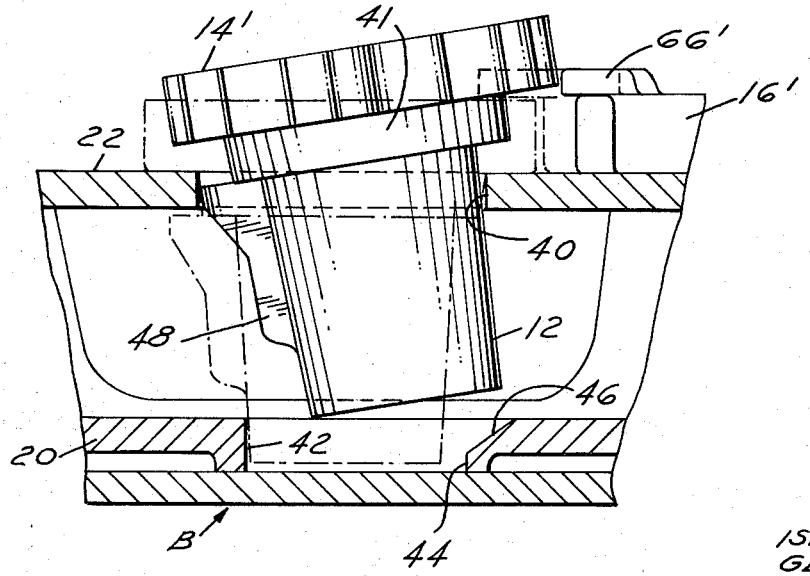

VEHICLE TIE-DOWN DEVICE

SUMMARY OF THE INVENTION

One object of this invention is to provide an improved tie-down device so constructed as to facilitate the insertion and withdrawal of the shaft, but at the same time prevent accidental withdrawal of the shaft.

Another object is to provide an improved tie-down device in which the shaft may be withdrawn with the tie-down chain attached. This is sometimes done in order to change or replace the chain.

Another object is to provide a tie-down device in which the shaft is capable of being tilted to facilitate insertion and withdrawal.

Another object is to provide spaced bearings for the shaft, and a lug on the shaft normally blocking withdrawal thereof, one of the bearings being relieved so that the shaft may be tilted enough to permit the lug to clear the other bearing, so that the shaft may be withdrawn while tilted.

Another object is to provide a tie-down device in which the relieved bearing is enlarged and preferably flared at one side to permit the shaft to be tilted during insertion and withdrawal.

Another object is to provide a ratchet and pawl for controlling the rotation of the shaft, and a tab on the pawl to prevent accidental withdrawal of the shaft.

Another object is to provide a tie-down device having an improved lock pin and handle construction.

Another object is to provide an improved tie-down device which is designed especially for tying down vehicles having extremely low clearance.

Other objects and features of the invention will become apparent as the description proceeds, especially when taken in conjunction with the accompanying drawings, wherein:

FIG. 3 is a side elevational view with portions of the rail broken away and in section to more clearly illustrate the carriage of FIG. 2.

FIG. 4 is a view partly in section and partly in elevation taken substantially on the line 4—4 in FIG. 3.

FIG. 5 is a view partly in section and partly in elevation taken substantially on the line 5—5 in FIG. 3.

FIG. 6 is a fragmentary sectional view of a portion of FIG. 3, showing the shaft in normal operative position in doted lines and tilted for removal or installation in solid lines.

FIG. 7 is a fragmentary sectional view taken substantially on the line 7—7 in FIG. 3.

FIG. 8 is similar to FIG. 6 but illustrates a modification.

Referring now more particularly to the drawings, A is a longitudinally extending elongated substantially flat horizontal deck of a transport, such for example as a railroad flat car, B are stationary main supporting channels or rails disposed in laterally spaced substantially parallel relation to each other and extending throughout substantially the entire length of the deck, and C are carriages that are within the main rails B at longitudinally spaced points thereof and are individually adjustable lengthwise of the rails.

Figure 1:
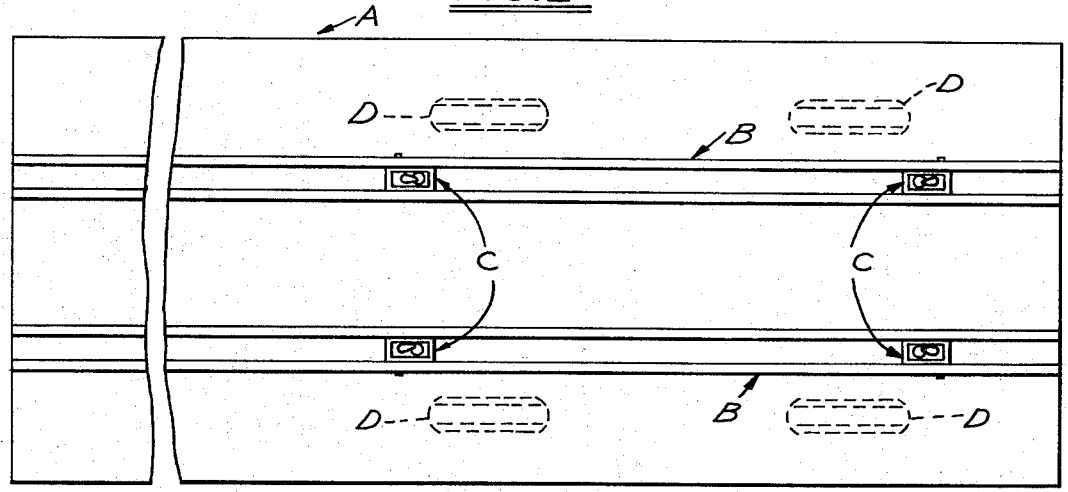
FIG. 1 is a fragmentary top plan view of the deck of a transport equipped with tie-down structure embodying our invention, and showing by dotted lines the positions of four ground engaging wheels of one vehicle supported upon the deck.

Preferably the area of the deck A is such that it is capable of supporting thereon in tandem several vehicles of various sizes, i.e., vehicles having different lengths and/or widths. In the present instance, there is shown in FIG. 1 an outline of four ground-engaging wheels D of one of the vehicles mentioned.

The parallel main supporting rails B are rigidly secured to and serve effectively as reinforcements for the supporting deck A to prevent such deck from bending or buckling under the load of the vehicles thereon. Such main supporting rails B also serve as guides for the vehicles while they are being loaded onto or unloaded from the supporting deck A.

The adjustable carriages C are slidable lengthwise of and are supported by the main supporting rails B. Preferably, four adjustable carriages C are provided for tying down each vehicle and are arranged in transversely aligned pairs at longitudinally spaced points of the main supporting rails B (see FIG. 1).

Each adjustable carriage C includes a frame 10, a vertical stub shaft 12, a ratchet gear 14 secured to the upper end of the stub shaft 12, a ratchet pawl 16 adapted to engage the teeth of the ratchet gear and prevent rotation of the ratchet gear and stub shaft in one direction, and a transversely extending lock pin 18.

The carriage frame 10 comprises a body or casting 20 and a low, flat, horizontal top wall or plate 22. The body or casting 20 is an elongated member having a bottom wall or base 24 and laterally spaced upstanding portions 26 at one end which have flat horizontal top surfaces 28 connected by a bridge 29. The body 20 has a laterally extending upstanding portion 30 at the opposite end which has a flat horizontal top surface 32 in the plane of the top surfaces 28. The plate 22 rests upon the top surfaces 28 and 32 of the upstanding portions 26 and 30. Means such as the cap screws 34 which thread into the upstanding portions 26 secure the plate 22 to the body 20.

The vertical stub shaft 12 is disposed in the space between the top plate 22 and the base 24 of the body 20 and has its ends journaled for rotation in the holes or bearings 40 and 42 in the top plate and in the base. The shaft is of circular cross section although tapered slightly from top to bottom.

The upper bearing 40 is circular. The shaft 12 has an enlarged circular collar 41 at the upper end which is closely received and journaled for rotation in the bearing 40.

The lower bearing 42 is of arcuate or circular form throughout approximately 180°. This arcuate portion is designated 43 in FIG. 7 and is disposed toward the end of the carriage having the bridge 29. The lower end of shaft 12 is closely received and journaled for rotation in the arcuate portion of the bearing 42. The opposite side of the bearing 42, that is the side adjacent to the end of the carriage having the lock pin 18, is enlarged where indicated at 44 (see FIG. 7) and the upper portion thereof is flared outwardly and upwardly as indicated at 46. The enlarged and flared portion of the lower bearing 42 permits the shaft 12 to be tilted as seen in FIG. 6 and as described more fully hereinafter.

A longitudinally extending rib or lug 48 on the stub shaft 12 beneath plate 22 prevents the stub shaft from being lifted vertically out of its bearings. However, the enlarged and flared portion 44,46 of the lower bearing 42 permits the shaft 12 to be tilted to the solid line position of FIG. 6 so that the lug 48 will clear the upper bearing 40, permitting the tilted shaft to be withdrawn upwardly through the upper bearing 40 and separated from the carriage as described more fully hereinafter.

To accomplish this, the shaft must be rotated so that the lug 48 faces toward the end of the carriage having the bridge 29 under which the chain extends. Preferably the lug 48 at this time is on the longitudinal center line of the carriage, but it may lie within approximately a 30° arc, 15° on either side of the longitudinal center line, and still clear the upper bearing hole 40 when the shaft is tilted as in FIG. 6. The gear 14 has a mark 47 on its top surface which is aligned with a mark 45 on top plate 22 when lug 48 is on the longitudinal center line of the carriage facing the bridge 29.

The stub shaft 12 has a vertically extending transverse slot 49 for receiving the end of a flexible linear element, here shown as a link chain 50, used in tying down the vehicle on the deck of the transport. As shown, the end link 52 of the chain is extended into the slot 49, and a retainer pin 54 extending across the slot 49 and secured in suitable holes in the stub shaft 12 extends through the end link 52 to secure the end of the chain. The opposite end of the chain has a hook 56 adapted to engage in a suitable opening in the frame E of the vehicle. The chain extends from the stub shaft 12 through a tunnel 57 between the upstanding portions 26 and beneath the bridge 29 at one end of the carriage.

The ratchet gear 14 is integral with or secured to the upper end of stub shaft 12 above collar 41 so as to rotate in a horizontal plane. The ratchet gear 14 overlies plate 22 and has a raised central circular boss 58 provided with a polygonal slot 59 which is adapted to receive a suitable crank for rotating the ratchet gear and winding up the link chain 50 on stub shaft 12. The pawl 16 prevents rotation of the ratchet gear 14 and hence the stub shaft 12 in one direction. The ratchet pawl is secured on the top of plate 22 in the same horizontal plane as the ratchet gear 14, being pivoted to the top plate for rotation about a vertical axis on the upper, enlarged cylindrical portion 61 of the screw 62 which threads into the upstanding portion 30 of body 20.

The pawl 16 has a recessed bottom surface 64. A spring 68 disposed in the recess 64 and extending around the enlarged portion 61 of screw 62 has one bent end extended into a hole 70 in the top plate 22 and the other bent end extended into a hole 72 in the pawl 16. Thus considering FIG. 2, the pawl is urged counterclockwise into engagement with the teeth of the ratchet gear 14, preventing the ratchet gear from rotating clockwise but permitting counterclockwise rotation thereof.

The pawl 16 has a tab 66 which may be integral with the pawl. The tab overlies the gear 14 when the pawl is engaged with the gear teeth and also continuously during ratcheting when the pawl passes over the gear teeth, preventing accidental upward withdrawal of the gear. The top surface of the tab is flush with or in the plane of the top surface of the pawl. The top surface of the boss 58 on gear 14 is in the same plane. Hence the boss protects the pawl from being struck and accidentally released by the undercarriage of a moving vehicle, which might happen if the vehicle should be stopped suddenly causing its undercarriage to dip.

The tab 66 does not interfere with ratcheting of the gear to tighten the chain. However, the tab will prevent the shaft 12 from lifting up accidentally as, for example, when the tool is removed from slot 59 in the gear after ratcheting.

The lock pin 18 is an elongated cylindrical member which extends transversely of the carriage and is mounted on the carriage for rotation and for axial sliding movement. The casting 20 has a pair of aligned laterally outwardly extending bosses 76 which project from the upstanding portion 30 at one end of the body 20. The end portions of the lock pin 18 are slidably and rotatably received in aligned cylindrical passages 78 in the bosses 76 and the intermediate portion of the lock pin extends across the cavity 80 within the upstanding portion 30.

A handle in the form of a transverse pin 82 is secured to an intermediate portion of the lock pin 18 and extends through an elongated transverse slot 84 in the rear wall of the upstanding portion 30. A coil spring 86 encircles the lock pin and is compressed between the handle 82 and an interior side wall 88 of the cavity 80 so as to urge the lock pin 18 to its extended position as viewed in FIGS. 2 and 5 in which handle 82 engages the end of the slot. The slot 84 will be seen in FIGS. 2 and 5 to be generally T-shaped having an intermediate offset detent portion 90 for receiving the handle 82 when the lock pin is retracted and rotated, thereby retaining the lock pin in retracted position. It will be understood that lock pin 18 may be extended in the opposite direction by merely assembling the coil spring 86 on the lock pin between the handle 82 and the opposite interior side wall 91 of cavity 80. The opposite end of slot 84 would then, of course, determine the limit of movement of the lock pin to its extended position.

The handle 82 extends through a transverse hole in lock pin 18. The inner end of the handle is formed with a recess 85 to facilitate the spreading or expansion of the inner end after the handle is inserted through the hole in the lock pin. A collar 87 on the handle limits the insertion of the handle. The expanded inner end of the handle and the collar secure the handle to the lock pin. The handle has an enlarged knob 89 on its outer end for convenience of manipulation.

Referring again to the rails B, each rail has parallel upstanding side walls 92 and 94. The outer side wall 92 has a series of equally spaced holes 96 formed along the length thereof. The lock pin 18 is of a slightly smaller diameter than holes 96 so as to be free to enter any one of the holes (see FIGS. 2 and 5) and lock the carriage against longitudinal movement.

The upstanding side walls 92 and 94 of the rails B terminate in horizontal inturned flanges 98 which overlie the bosses 76 of the carriage. It will be noted that the upstanding portions 26 of the carriage also have laterally outwardly extending bosses 100 generally similar to the bosses 76. The flanges 98 extend over the bosses 100 as well as the bosses 76 to prevent the carriages from lifting out of the rails.

In use, the vehicles to be transported are moved onto the deck A of the transport from one end thereof to be supported in tandem thereon. Depending upon the location of the carriages C relative to the ground-engaging wheels D of the vehicles after the latter are loaded, the respective carriages C may be moved lengthwise of the rails B to positions in spaced relation to the ground-engaging wheels D to enable the tie-down chains 50 to be extended upwardly at the proper angles for tie-down purposes. During this time, the lock pins 18 are in their retracted positions. When the carriages are properly located, the hooks 56 at the free ends of the tie-down chains 50 may be connected to suitable holes in the frames E of the vehicles, and the handles 82 may be removed from the detent portions 90 of the slots 84 to allow the coil springs 86 to snap the locking pins 18 to their extended positions through registering holes 96 in the rails B to lock the carriages C in adjusted positions. The stub shafts 12 may then be rotated by cranks (not shown) inserted in the polygonal slots 59 in the ratchet gears 14 to tighten or tension the tie-down chains 50 to tie down the vehicles. The ratchet gears 14 are rotated counterclockwise in FIG. 2 during tightening, and the ratchet pawls 16 prevent reverse rotation. The tab 66 does not interfere with the ratcheting of gear 14, but prevents the gear 14 and shaft 12 from accidentally lifting up even when the pawl passes over the gear teeth during the ratcheting operation.

In order to release a vehicle, the lock pins 18 are retracted to release them from the holes 96 in the rails, as by striking the projecting ends of the lock pins with a mallet, permitting the carriages C to move in a direction to slacken the chains 50 and permit them to be released from the vehicle frames.

The carriages C have an overall vertical dimension which is reduced to a minimum so as to clear the vehicles being loaded and unloaded, even those vehicles with extremely low clearance.

Figure 2:
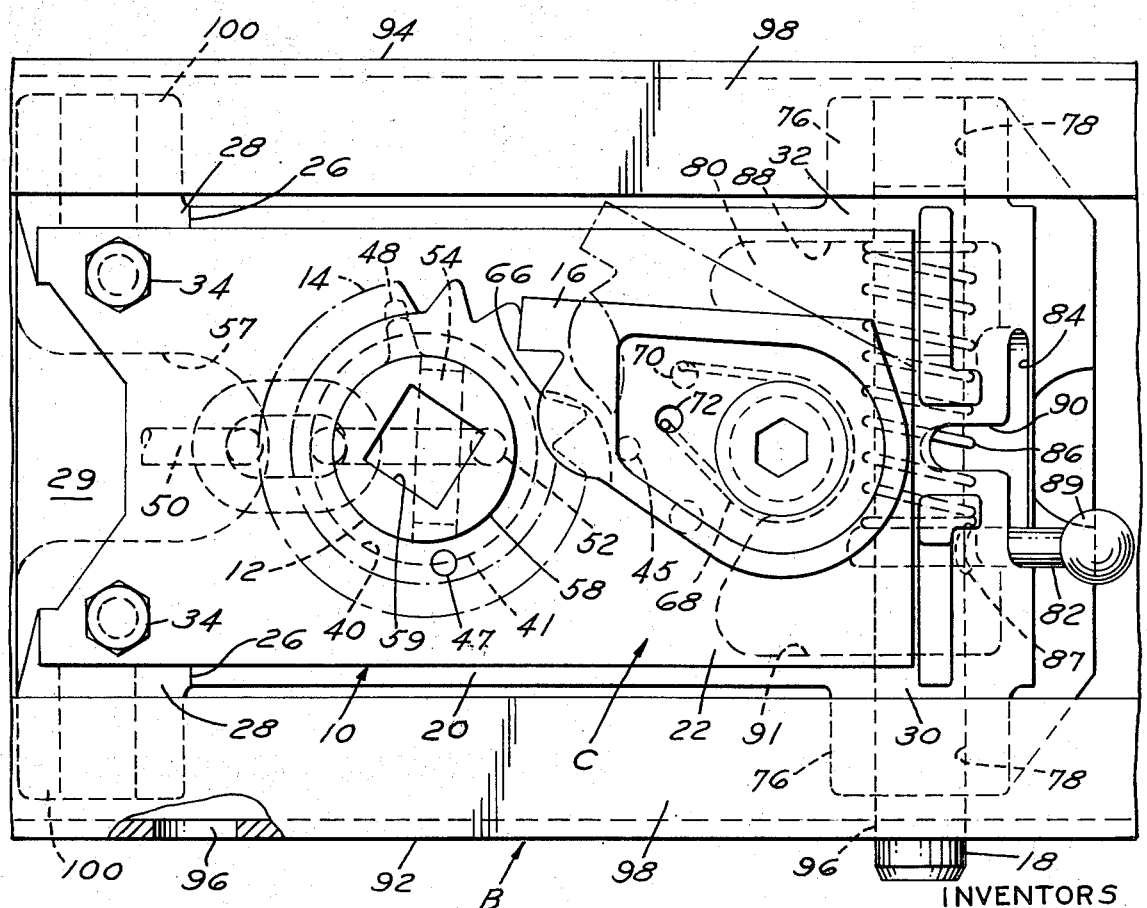
FIG. 2 is an enlarged fragmentary top plan view of tie-down structure embodying our invention with parts broken away and in section, the pawl being shown engaged in solid lines and released in dot-dash lines.

When it is desired to remove or replace the chain 50, this can be done by (1) manually retracting the pawl 16 to the dot-dash position of FIG. 2, (2) rotating the shaft 12 so that its lug 48 faces toward the end of the carriage having the bridge 29 to within approximately 30° of the carriage center line, (3) tilting the shaft to the solid line position of FIG. 6 and then (4) raising the tilted shaft to withdraw the shaft with the chain attached through the upper bearing hole 40. The relieved and flared portion 44, 46 of the lower bearing 40 permits this tilting of the shaft. The upper bearing hole 40 is of course large enough to allow the chain to pass through it when the shaft is withdrawn.

The enlarged and flared portion 44, 46 of the lower bearing 42 is on the side of the bearing opposite to the load bearing side. In other words, when the tie-down device is under load with the chain in tension, the arcuate side 43 of the bearing 42 is the only side under load. This load bearing side is always the same, and relieving and flaring the opposite side of the bearing 40 to enable the shaft to tilt does not affect the load capacity of the carriage.

FIG. 8 shows a modification in which the gear 14' is thicker than the gear 14 shown in FIG. 6, having a thickness equal to the combined thickness of the gear 14 and boss 58 in FIG. 6. The gear 14' has no raised embossment. Its thickness approximates that of the pawl 16'. However, the tab 66' on the pawl is above the gear and pawl. The tab may be formed integrally with the pawl or it may be a separate piece permanently attached to the pawl. The tab overlies the gear when the pawl is engaged with the gear teeth, as seen in dotted lines in FIG. 8. When the pawl is retracted, the shaft 12 and gear 14' may be withdrawn or inserted by tilting to the solid line position. The gear 14' and pawl 16' are otherwise like the gear 14 and pawl 16 previously described. The rest of the structure in FIG. 8 is like that in FIGS. 1–6, and corresponding parts in FIG. 8 bear the same reference numbers.

What we claim as our invention is:

1. A carriage for use in a vehicle tie-down structure including a longitudinally extending rail adapted to be anchored lengthwise upon a longitudinally extending deck of a transport, said carriage being adapted to be carried by and locked in longitudinally adjusted position on said rail, said carriage having a frame, spaced upper and lower bearings on said frame, a generally upright shaft mounted for rotation in said bearings and adapted to have a flexible element wound thereon between said bearings to engage and hold a vehicle, ratchet gear and pawl means for preventing rotation of said shaft in one direction, and a lug on said shaft beneath said upper bearing to block upward axial withdrawal of said shaft and separation thereof from said frame, said lower bearing being relieved at one side so that said shaft may be tilted enough to permit said lug to clear said upper bearing, whereby said shaft while thus tilted may be withdrawn upwardly through said upper bearing.

2. The carriage defined in claim 1, wherein said frame has guide means for said flexible element, said guide means being at the side of said lower bearing opposite the relieved side thereof.

3. The carriage defined in claim 2, wherein said guide means includes a tunnel at one end of said frame.

4. The carriage defined in claim 2, wherein said lower bearing is arcuate at the side opposite said relieved side, said relieved side being enlarged relative to the arc at said opposite side.

5. The carriage defined in claim 2, wherein said lower bearing is arcuate at the side opposite said relieved side, said relieved side being upwardly flared.

6. The carriage defined in claim 2, wherein said lower bearing is arcuate at the side opposite said relieved side, said relieved side being enlarged relative to the arc at said opposite side and upwardly flared.

7. The carriage defined in claim 6, wherein said ratchet and pawl means includes a gear fixed upon the upper end of said shaft above said upper bearing for rotation with said shaft, and a pawl pivotally mounted on said frame and engageable with the teeth of said gear to prevent rotation thereof in one direction, said pawl having a tab overlying said gear in the position of said pawl engaging the teeth of said gear to prevent accidental upward withdrawal of said shaft.

8. The carriage defined in claim 7, wherein said guide means includes a tunnel at one end of said frame.

9. The carriage defined in claim 1, wherein said lower bearing has an arcuate bearing surface of approximately 180° in extent at the side thereof opposite said relieved side.

10. The carriage defined in claim 1, wherein said upper bearing is large enough to accommodate said shaft and an attached flexible element when said shaft is tilted and withdrawn upwardly therethrough as aforesaid.

11. The carriage defined in claim 1, wherein said ratchet and pawl means includes a gear fixed upon the upper end of said shaft above said upper bearing for rotation with said shaft, and a pawl pivotally mounted on said frame and engageable with the teeth of said gear to prevent rotation thereof in one direction, said pawl having a tab overlying said gear when said pawl is engaged with said gear teeth and also continuously during ratchetting when said pawl passes over said gear teeth to prevent accidental upward withdrawal of said shaft.

12. A carriage for use in a vehicle tie-down structure including a longitudinally extending rail adapted to be anchored lengthwise upon a longitudinally extending deck of a transport, said carriage being adapted to be carried by and locked in longitudinally adjusted position on said rail, said carriage having a frame, spaced upper and lower bearings on said frame, a generally upright shaft mounted for rotation in said bearings and adapted to have a flexible element wound thereon to engage and hold a vehicle, ratchet gear and pawl means for preventing rotation of said shaft in one direction, a lug on said shaft engageable beneath a portion of said frame surrounding one of said bearings to normally block upward axial withdrawal of said shaft and separation thereof from said frame, the other of said bearings being relieved at one side at least 180° so that said shaft may be tilted enough to permit said lug to clear said portion of said frame, whereby said shaft while thus tilted may be withdrawn upwardly through said upper bearing, and guide means on said frame for said flexible element at the side of said other bearing opposite the relieved side thereof.

13. A carriage for use in a vehicle tie-down structure including a longitudinally extending rail adapted to be anchored lengthwise upon a longitudinally extending deck of a transport, said carriage being adapted to be carried by and movable lengthwise of said rail, said carriage having a frame, a shaft mounted for rotation on said frame and adapted to have a flexible element wound thereon to engage and hold a vehicle, ratchet gear and pawl means for preventing rotation of said shaft in one direction, a transverse lock pin axially slidably mounted on said frame for movement between an extended position projecting through a selected opening in said rail to lock said carriage to said rail in longitudinally adjusted position and a retracted position withdrawn from the latter opening, and an elongated handle projecting transversely from said lock pin for moving the latter, and means for securing said handle to said lock pin comprising a collar on said handle engaging one side of said lock pin and an expanded inner end of said handle engaging the opposite side of said lock pin.

14. The carriage defined in claim 13, wherein said inner end of said handle is recessed to facilitate expansion thereof.

* * * * *